(12) United States Patent
Zielke

(10) Patent No.: US 6,627,831 B1
(45) Date of Patent: Sep. 30, 2003

(54) INSULATING COMPONENT FOR HIGH-VOLTAGE INSTALLATIONS AND A METHOD FOR THE PRODUCTION THEREOF

(75) Inventor: Eberhard Zielke, Berlin (DE)

(73) Assignee: Siemens Aktiensellscraft, Munich (DE)

( * ) Notice: Subject to any disclaimer, the term of this patent is extended or adjusted under 35 U.S.C. 154(b) by 0 days.

(21) Appl. No.: 09/719,084
(22) PCT Filed: Jun. 10, 1999
(86) PCT No.: PCT/DE99/01747
§ 371 (c)(1), (2), (4) Date: Apr. 2, 2001
(87) PCT Pub. No.: WO99/65128
PCT Pub. Date: Dec. 16, 1999

(30) Foreign Application Priority Data

Jun. 10, 1998 (DE) .......................... 198 26 202

(51) Int. Cl.⁷ ............................................. H01H 33/18
(52) U.S. Cl. ........................................... 218/43; 218/64
(58) Field of Search ............................ 218/43, 45, 51, 218/52, 53, 54, 62, 64, 73, 155

(56) References Cited

U.S. PATENT DOCUMENTS 5,151,565 A * 9/1992 Perret ........................ 218/154

FOREIGN PATENT DOCUMENTS

| DE | 26 25 071 | 6/1976 |
| DE | 26 26 855 | 6/1976 |
| DE | 195 19 992 A1 | 5/1995 |
| JP | 55-56002 A | 4/1980 |

OTHER PUBLICATIONS

Schmunk, Miller, Becker: "Tests on irradiated insulator materials", Journal of Nuclear Material, Bd. 123, 1984, Seiten 1381–1385, SP000852523, (No date).

* cited by examiner

Primary Examiner—Lincoln Donovan
(74) Attorney, Agent, or Firm—Morrison & Foerster LLP

(57) ABSTRACT

Insulating component for high-voltage systems, and a method for its production

Figure 1:
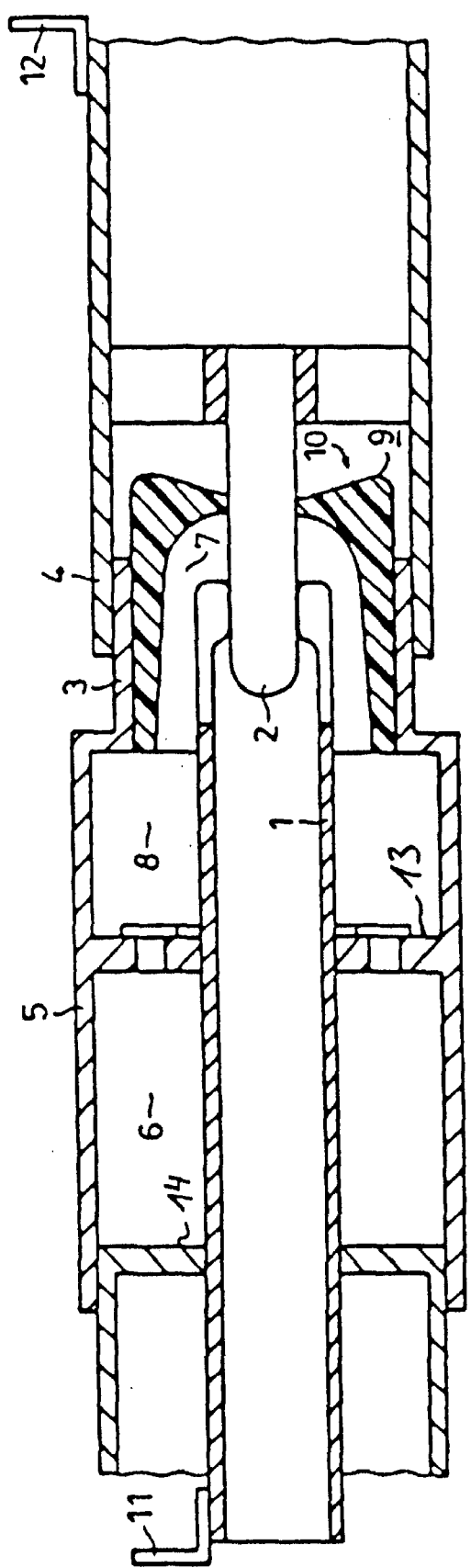

In an insulating component (9, 18) for high-voltage systems, in particular gas-insulated systems, the invention provides for the material of the component to be treated with alpha, beta or gamma radiation in order to increase the conductivity, at least in a region (10, 16) of its surface in which it is subject to higher dielectric loading during operation than in other regions.

3 Claims, 2 Drawing Sheets

INSULATING COMPONENT FOR HIGH-VOLTAGE INSTALLATIONS AND A METHOD FOR THE PRODUCTION THEREOF

This application is based on PCT/DE99/01747, which claims priority to German Application No. 198 126202.7 which was filed on Jun. 10, 1998.

The invention relates to an insulating component, which is at least partially composed of a plastic, for high-voltage systems, in particular for use in gas-insulated systems, whose conductivity is increased in the region of its surface, and to a method for producing such a component.

An insulating component is known, for example, from DE-C 26 26 855. Such dielectric components are used, for example, in electrical high-voltage switches, in particular in high-voltage power breakers, as spacers or as nozzles for carrying an insulating-gas flow.

An insulating component for high-voltage systems is known from DE 26 25 071 A1, in which surface regions are provided with increased electrical conductivity by means of implanted ions.

In encapsulated high-voltage switchgear assemblies, such components are used, for example, as supports for busbar conductors or as bushings. They may be composed, for example, of casting resin, for example an epoxy resin, or of PTFE (polytetrafluoroethylene), or a similar polymer.

Once subjected to a high dielectric load, that is to say in the presence of high electrical field strengths, especially when the field strength has a component tangential to the surface of the component, there is an increased tendency for displacement currents to flow on the surface of the component, which can also lead to electrical flashovers. Such flashovers can then initiate larger flashovers between conductors, and must therefore invariably be avoided.

According to DE-C 26 26 855, a poorly conductive fabric is embedded in the region of the surface of the component in order to dissipate surface charges.

An insulating component is known from DE 195 19 992 A1, whose surface roughness is increased in order to dissipate surface charges. The increased surface roughness results in uneven areas which promote tip discharges due to corresponding field distortion. This results in charge carriers being emitted and surface charges being dissipated.

However, mechanical machining of the surface is necessary to produce such a surface according to the prior art.

In contrast, the present invention is based on the object of providing an insulating component of the type mentioned initially, in which the dissipation of surface charges is assisted, and which can be produced and machined in a simple manner with little effort.

The object is achieved according to the invention in that the material of the component is treated with beta or gamma radiation in order to increase the conductivity at least in a region of its surface in which it is subject to higher dielectric loading during operation than in other regions.

The good mechanical robustness and, above all, the good insulation characteristics of the plastics from which such insulating components are produced result from the molecular structure, which has a large number of long carbon chains. These carbon chains likewise result in a high electrical resistance.

The measure of irradiation with beta or gamma radiation destroys the molecular chains in the region into which the radiation penetrates. This on the one hand makes it easier to carry out mechanical machining and on the other hand decreases the electrical resistivity, so that surface charges can be dissipated by electrical conduction in this region on the surface of the insulating component.

Experiments have shown that the decay time for surface charges is considerably shortened (halved) by such treatment of insulating components.

In that region of an insulating component which is not subject to any increased dielectric loads during operation, such treatment of the component is superfluous.

An advantageous refinement of the invention provides for the conductivity to be increased significantly to a depth of at least 5 mm in the at least one region.

Such treatment of the material to a depth of 5 mm, and advantageously to a depth of about 10 mm, results in the effect of reduced surface resistance being retained even if a part of the surface is worn away, for example under the influence of an arc, once the component has been used.

This is the situation especially when the invention is used in a dielectric nozzle in the interrupt unit of a high-voltage circuit breaker.

However, in the configuration according to the invention, the surface of such a nozzle body is only partially worn away even after a number of load switching operations, so that a material which has been treated by the irradiation and whose resistance has been reduced remains in the region of increased dielectric loading, and dissipates any surface charges which may be present.

A further advantageous refinement of the invention provides for the component to be composed of PTFE.

The production of dielectric components composed of PTFE or else of casting resin is quite normal in this field and can be carried out in widely different forms, without major effort, by casting or sintering.

The invention may also comprise a method for producing an insulating component, in which the component is subject to alpha, beta or gamma radiation in the at least one region.

In addition, the invention can be refined by the component being subjected to the influence of an arc, at least in the one region.

The immediate proximity of an arc subjects the component to increased beta radiation, which results in the desired effect occurring as a function of the intensity and the duration of the influence of the arc. This treatment with an arc can be carried out either instead of systematic irradiation of the component, or as a supplement to it. Particularly if the component is a nozzle body for a high-voltage circuit breaker, the component can be subjected to arcs systematically before or after being brought into use, even when installed, in order to achieve the effect according to the invention. The switching arc can be used as an arc for this purpose.

Figure 2:
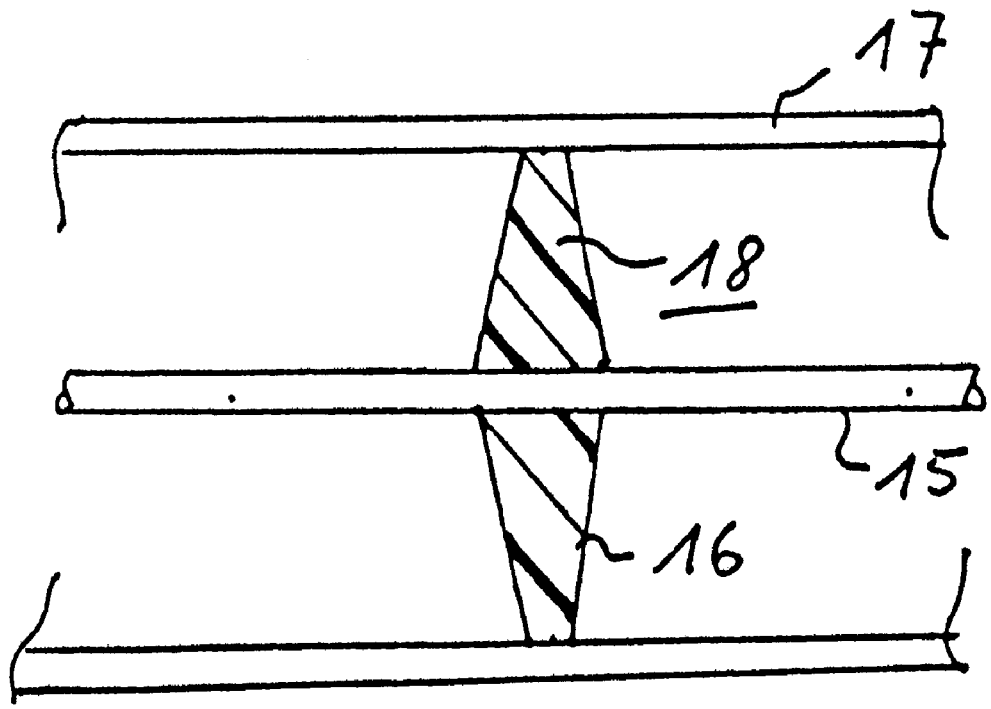

The invention will be described in the following text with reference to an exemplary embodiment, which is illustrated in the drawing, in which:

FIG. 1 shows, in a longitudinal schematic section, a part of an interrupter unit of a high-voltage circuit breaker, FIG. 2 shows a cross section of a dielectric support in the form of a disk.

FIG. 1 shows an interrupter unit of a high-voltage circuit breaker with a first arc contact piece 1, which can be driven, in the form of a tulip contact, and a second, in particular fixed, arc contact piece 2 in the form of a pin. It is also possible to provide for the two arc contact pieces 1, 2 to move with respect to one another in the course of a switching movement.

A first rated current contact piece 3, which can likewise be driven, is connected to the first arc contact piece 1 and interacts with a stationary, second rated current contact piece 4 when connected.

The arc contact piece 1, which can be driven, is connected to a cylinder base 13 which, for its part, is connected to an external cylinder 5. The external cylinder 5 acts over a part of its length as a compression cylinder, which compresses extinguishing gas in the compression volume 6 in the space between it and the stationary compression piston 14 during the disconnection movement. Sulfur hexafluoride is normally used as the extinguishing gas in such a circuit breaker.

At an end of the cylinder 5 facing the stationary, second arc contact piece 2, this cylinder 5 encloses a heating area 8, which is connected to the compression area 6 via valves in the cylinder base 13.

The heating area 8 is connected via a channel 7 to the arcing area, which is located between the arc contact pieces 1, 2 and disconnected. Extinguishing gas is heated and expanded there when an arc is struck and is then stored in the heating area 8 and flows back from there to the arc, after a current zero crossing, in order to prevent restriking.

The moving contact pieces 1, 3 are connected to a connection 11 on the one side of the interrupter unit, and the stationary contact pieces 2, 4 are connected to a connection 12 on the other side of the interrupter unit.

In order to control the extinguishing gas flow to the heating area 8, and from there back to the arcing area, and from there through the switching path, an insulating component 9 is provided, which is in the form of a nozzle and is normally composed of polytetrafluoroethylene.

In the region of its end face 10, the component is subject to particularly high dielectric loads in operation, particularly when the circuit breaker is in the disconnected state, when the end face 10 is opposite the stationary arc contact piece 2. The insulating component 9 is connected to the rated current contact 3, which can be driven and is at a different potential to that of the opposing contacts 2, 4. This results in an electrical field with high field strength. When surface charges are present on the end face 10, this can lead to displacement currents and flashovers when surface charges are present there. Such surface charges can also accumulate there in the long term when the circuit breaker is connected, if the material of the insulating component 9 has an excessively high electrical resistance in this region.

In order to prevent this, the insulating component 9 was subjected to irradiation by beta rays (electron beams) or gamma rays (shortwave electromagentic radiation) in the region of the end face 10, for a defined time before being fitted. The influence of this radiation partially changes the molecular structure of the dielectric material, in particular with long carbon chains being destroyed. This leads to a reduction in the electrical resistance in the region which is subjected to irradiation.

The penetration depth of the respective radiation into the material of the insulating component can be controlled by the energy of the radiation (the particle velocity for beta radiation, and the wavelength for gamma radiation). In this way, it is possible to define the depth from the surface to which the region of reduced electrical resistance extends.

The extent of the change in the molecular structure in the material of the insulating component, and thus the extent to which the electrical resistance is produced, can be influenced by the intensity of the irradiation (that is to say by the particle density with beta radiation and by the radiation intensity with gamma radiation).

FIG. 2 shows an insulating support 18 which is in the form of a disk, can be fitted in the encapsulation 17 of an $SF_6$ switchgear assembly or into a gas-insulated tubular conductor, where a high-voltage conductor 15 passes through and is supported by it. The dielectric support was irradiated in the described manner on at least one of its faces and has a correspondingly reduced electrical resistance in the surface region 16 there, in order to prevent the accumulation of surface charges. This can be advantageous particularly when such an insulating support is used for transmitting direct current.

What is claimed is:

1. An insulating component which is at least partially composed of a plastic, for high-voltage systems, for use in gas-insulated systems, having increased conductivity in a region of its surface, wherein
    a material of the component is treated with beta or gamma radiation to increase the conductivity, at least in an endface region of a surface in which the endface region is subject to higher dielectric loading during operation than in other regions.

2. The insulating component as claimed in claim 1, wherein in the region the conductivity is increased significantly to a depth of at least 5 mm.

3. The insulating component as claimed in claim 1 or 2, characterized in that the component (9, 18) is composed of PTFE.

* * * * *